(12) United States Patent  (10) Patent No.: US 9,197,356 B2
Zhou et al.  (45) Date of Patent: Nov. 24, 2015

(54) DISTRIBUTED SPATIAL MODE PROCESSING FOR SPATIAL-MODE MULTIPLEXED COMMUNICATION SYSTEMS

(71) Applicant: AT&T Intellectual Property I, L.P., Atlanta, GA (US)

(72) Inventors: Xiang Zhou, Holmdel, NJ (US); Peter David Magill, Freehold, NJ (US); Lynn Nelson, Matawan, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 365 days.

(21) Appl. No.: 13/679,774

(22) Filed: Nov. 16, 2012

(65) Prior Publication Data
US 2014/0140694 A1  May 22, 2014

(51) Int. Cl.
*H04J 14/04* (2006.01)
*H04J 14/02* (2006.01)

(52) U.S. Cl.
CPC . *H04J 14/04* (2013.01); *H04J 14/02* (2013.01)

(58) Field of Classification Search
CPC ..... H04J 14/04; H04J 14/021; H04J 14/0212; H04B 10/2581; H04B 10/2504
USPC ........... 398/79, 83, 45, 48, 49, 50, 56, 57, 59, 398/44, 82; 385/24, 37, 16, 17, 18, 126, 385/127, 28, 27, 39, 31
See application file for complete search history.

(56) References Cited

U.S. PATENT DOCUMENTS

| | | | |
|---|---|---|---|
| 2002/0146226 A1* | 10/2002 | Davis et al. | 385/126 |
| 2011/0176804 A1* | 7/2011 | Biinkert et al. | 398/45 |
| 2011/0188855 A1* | 8/2011 | Kokubun et al. | 398/43 |
| 2012/0170933 A1* | 7/2012 | Doerr et al. | 398/48 |
| 2012/0224807 A1* | 9/2012 | Winzer et al. | 385/28 |
| 2013/0236175 A1* | 9/2013 | Sethumadhavan et al. | 398/55 |

OTHER PUBLICATIONS

Koebele, Clemens et al., 40 km Transmission of Five Mode Division Multiplexed Data Streams at 100Gb/s with low MIMO-DSP Complexity, Paper, pp. 1-3, 2011.
Ryf, B. et al., Space-division multiplexing over 10 km of three-mode fiber using coherent 6×6 MIMO processing, Paper, Optical Society of America 2011, pp. 1-3.
Zhu, B. et al., Seven-core multicore fiber transmissions for passive optical network, Article, Optics Express, vol. 18, No. 11, May 11, 2010, pp. 1-6.
Chandrasekhar, S. et al., WDM/SDM Transmission of 10×128-Gb/s PDM-QPSK over 2688-km 7-Core Fiber with a per-Fiber Net Aggregrate Spectral-Efficiency Distance Product of 40,320 km—b/s/Hz, Paper, Optical Society of America, 2011, pp. 1-3.

(Continued)

*Primary Examiner* — Hanh Phan
(74) *Attorney, Agent, or Firm* — Chiesa Shahinian & Giantomasi PC

(57) ABSTRACT

A method and system for distributed spatial mode processing is disclosed where a plurality of optical signals is received via a plurality of spatial modes on a first optical link, spatial mode conversion is performed on the plurality of optical signals to switch the plurality of optical signals to different ones of the plurality of spatial modes and the plurality of optical signals is transmitted via the different ones of the plurality of spatial modes on a second optical link where spatial mode filtering may occur.

20 Claims, 6 Drawing Sheets

(56) References Cited

OTHER PUBLICATIONS

Xia, Chen et al., Supermodes for optical transmission, Paper, Optics Express, vol. 19, No. 7., Aug. 11, 2011, pp. 1-12.
Ryf, R. et al., Coherent 1200-km 6×6 MIMO Mode-Multiplexed Transmission over 3-core Microstructured Fiber, Paper, Optical Society of America, 2011, pp. 1-3.
Winzer, Peter J., Outage calculations for spatially multiplexed fiber links, Paper, Optical Society of America, 2010, pp. 1-3.
An Li et al., Reception of Mode and Polarization Multiplexed 107-Gb/s CO-OFDM Signal over a Two-Mode Fiber, Paper, Optical Society of America, 2010, pp. 1-3.
Salsi, Massimiliano et al., Transmission at 2×100Gb/s, over Two Modes of 40km-long Prototype Few-Mode Fiber, using LCOS-based Mode Multiplexer and Demultiplexer, Paper, Optical Society of America, pp. 1-3, 2011.
Kitayama, Ken-Ichi et al., Impulse Response Prediction Based on Experimental Mode Coupling Coefficient in a 10-km Long Graded-Index Fiber, Article, IEEE Journal of Quantum Electronics, vol. QE-16, No. 3, Mar. 1980, pp. 356-362.

* cited by examiner

DISTRIBUTED SPATIAL MODE PROCESSING FOR SPATIAL-MODE MULTIPLEXED COMMUNICATION SYSTEMS

TECHNICAL FIELD

The present disclosure relates to optical communication systems and in particular to systems and methods for improving the transmission performance of optical communication systems that transmit signals via multiple spatial modes.

BACKGROUND

Optical communication systems are systems in which data is transmitted as light over optical fibers. It is widely recognized that single-mode fiber capacity may soon approach a limit imposed by fiber nonlinearity, called the nonlinear Shannon limit. Since time-, wavelength-, and polarization-division multiplexing have all been utilized already, recently the research community has started to explore the spatial dimension, utilizing so-called space-division multiplexing (SDM), in order to further increase the fiber capacity to meet ever-growing capacity demand.

A mode of an optical fiber is a self-consistent, transverse intensity profile that maintains its shape as the light propagates down the fiber. An optical fiber has only a finite number of guided propagation modes, the intensity distributions of which have a finite extent around the fiber core. The number of guided modes, their transverse amplitude profiles, and their propagation constants depend on the details of the fiber structure (i.e. core and cladding diameters and core and cladding refractive indices) and on the optical frequency. A single-mode fiber supports only a single guided mode per polarization direction, the lowest-order mode ($LP_{01}$), which has an intensity profile similar to that of a Gaussian beam. SDM can be realized by several possible methods. One of the methods for space-division multiplexing includes transmitting multiple independent signals over different spatial modes of a multi-mode or few-mode fiber. Other methods for space-division multiplexing include transmitting multiple signals over multiple single-mode cores in an "uncoupled" (actually very weakly coupled) multi-core fiber or over super-modes in a coupled multi-core fiber.

However, for an SDM system based on few-mode fiber or coupled-multi-core fiber, there usually exists large inter-modal dispersion between the orthogonal spatial modes (except for the degenerate modes). Also, non-ideal fiber manufacturing and the cabling process, as well as accidental fiber bending, may result in mode coupling when the signal propagates down the fiber.

In order to properly de-multiplex the signal at the receiver, a multi-input-multi-output (MIMO) adaptive filter would be required. For a typical long-haul transmission system, prohibitively long tap lengths would be required (i.e., tens of thousands of taps typically would be required for just a three-mode fiber). Moreover, the signals transmitted on different spatial modes in a multi-mode fiber (or a coupled multi-core fiber) may experience different amounts of loss. Such mode-dependent loss will also limit the overall fiber capacity. For an SDM system using "uncoupled" multi-core fibers, MIMO processing is not commonly used for spatial mode separation at the receiver. However, a mode-dependent crosstalk still may be detected in the SDM system using "uncoupled" multi-core fibers. For example, for a regular 7-core fiber, crosstalk in the center core will be significantly higher than in the 6 other cores. For the case of 7-core fiber, the center core has worse transmission performance, which limits the fiber capacity.

SUMMARY

In one embodiment a plurality of optical signals is received via a plurality of spatial modes on a first optical link, spatial mode conversion is performed on the plurality of optical signals to switch the plurality of optical signals to different ones of the plurality of spatial modes, and the plurality of optical signals is transmitted via the different ones of the plurality of spatial modes on a second optical link and the plurality of spatial modes is filtered during transmission along the second optical link, and performing spatial mode conversion on the plurality of optical signals to switch the plurality of optical signals to different ones of the plurality of spatial modes comprises: switching an optical signal received on each of the plurality of modes in the first optical link to a different one of the plurality of modes in the second optical link, wherein one of the plurality of spatial mode converters includes a Reconfigurable Optical Add-Drop Multiplexer, wherein the receiving a plurality of optical signals via a plurality of spatial modes on a first optical link, performing spatial mode conversion on the plurality of optical signals to switch the plurality of optical signals to different ones of the plurality of optical signals, and transmitting the plurality of optical signals via the different ones of the plurality of spatial modes on a second optical link are performed by a Reconfigurable Optical Add-Drop Multiplexer, wherein performing spatial mode conversion comprises: implementing random spatial mode scrambling in the second optical link due to predetermined bends in the second optical link. The said spatial modes used for transmitting the signal can be regular modes in a multi-mode (or few-mode) fiber, super modes in a strongly coupled multi-core fiber, or the fundamental mode of each individual single-mode core in an "uncoupled" multi-core fiber.

DETAILED DESCRIPTION

The present disclosure relates to methods and systems for distributed spatial mode processing in an optical communication system. Functions and techniques performed by systems for distributed spatial mode processing are described in detail with further references to the examples of FIGS. 1-13.

In an embodiment, a method and system for distributed spatial mode processing is described. The method and system for distributed spatial mode processing can be utilized to effectively mitigate the detrimental inter-modal dispersion, mode-dependent loss, and inter-mode crosstalk by introducing distributed mode conversion (or mode scrambling) along the fiber link. It is to be understood that, where only a portion of the available spatial modes are used for transmitting the signal, distributed spatial mode filtering can be used to reduce the detrimental modal crosstalk. The foregoing examples are to be understood as being in every respect illustrative but not restrictive.

Figure 1:
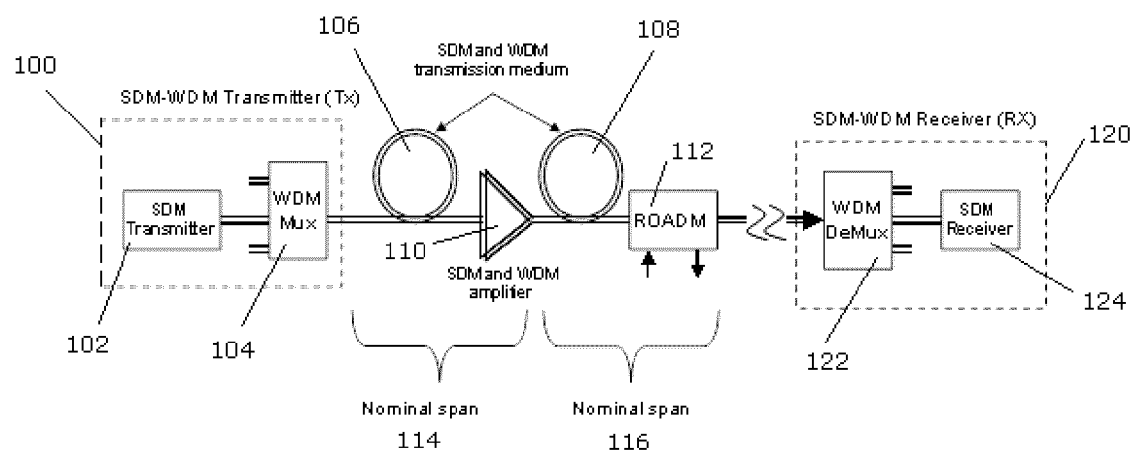
FIG. 1 illustrates an exemplary space-division multiplexing (SDM) and wavelength division multiplexing (WDM) transmission system, in accordance with an embodiment.

FIG. 1 illustrates an exemplary space-division multiplexing (SDM) and wavelength division multiplexing (WDM) transmission system, in accordance to an embodiment. The exemplary system of FIG. 1 includes a SDM-WDM transmitter 100, a first nominal span 114, a second nominal span 116, and a SDM-WDM receiver 120. The SDM-WDM transmitter 100 can include one or more SDM transmitters 102 communicatively coupled to one or more WDM multiplexers 104. In an embodiment, the SDM-WDM transmitter 100 can be used to multiplex and transmit a plurality of optical signals onto transmission medium 106. It is to be understood that the SDM-WDM transmitter 100 may have other structures and may contain other components as well, and that the SDM-WDM transmitter 100 is a high level representation of a SDM-WDM transmitter for illustrative purposes. The first nominal span 114 includes fiber-based SDM-WDM transmission medium 106 communicatively coupled to SDM-WDM amplifier 110 for amplifying optical signals to compensate the transmission loss of signal. The second nominal span 116 includes fiber-based SDM-WDM transmission medium 108 communicatively coupled to a reconfigurable optical add/drop multiplexer (ROADM) 112 for adding and dropping individual optical signals. It is to be understood that the fiber-based SDM-WDM transmission medium 108 can also be communicatively coupled to another SDM-WDM amplifier. The SDM-WDM receiver 120 can include one or more SDM receivers 124 communicatively coupled to one or more WDM demultiplexers 122. In an embodiment, the SDM-WDM receiver 120 can be used to demultiplex the plurality of optical signals received via transmission medium 106 and 108 and further process demultiplexed plurality of optical signals by the SDM receiver 120. It is to be understood that the SDM-WDM receiver 120 may have other structures and may contain other components as well, and that the SDM-WDM receiver 120 is a high level representation of a SDM-WDM receiver for illustrative purposes. For a system illustrated in FIG. 1, each single wavelength can be used to transmit multiple independent optical signals using several orthogonal spatial modes supported by fiber-based SDM and WDM transmission mediums 106 and 108. It is to be understood that optical signals can be amplified at a regular distance interval (e.g., every 50-100 km) of transmission to compensate the transmission loss.

Figures 2A, 2B, 2C:
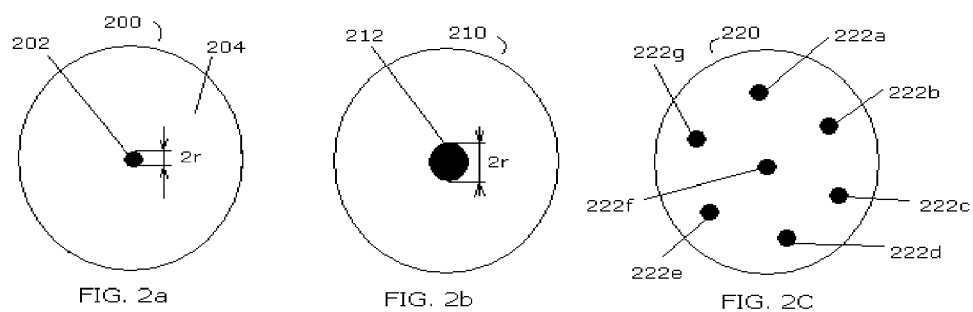
FIGS. 2a-2f illustrate exemplary variations of the SDM and WDM transmission media, in accordance to an embodiment.

FIGS. 2a-2f illustrate exemplary variations of the SDM and WDM transmission media, in accordance to an embodiment. FIG. 2a illustrates a conventional single-mode fiber 200. The single-mode fiber 200 includes a single core 202 surrounded by cladding 204. The core 202 provides a single spatial mode for signal transmission. In some cases, 12 single-mode fibers, each with 125 um cladding diameter and individually coated, are laid out in a row and then attached using a ribbon coating layer. While conventional single-mode fiber ribbons can serve as an alternative for an SDM transmission medium, in the single-mode fiber ribbons there is essentially no crosstalk between the cores.

FIG. 2b illustrates exemplary multi-mode/few-mode fiber 210. The multi-mode/few-mode fiber 210 has a single core 212 surrounded by cladding. In the multi-mode/few-mode fiber 210, the diameter of the core 212 is enlarged, as compared to the conventional single-mode fiber 200 of FIG. 2a, to support more than one transverse mode.

FIG. 2c illustrates an exemplary "uncoupled" multi-core fiber 220. In the "uncoupled" multi-core fiber 220, each core 222a-222g provides a separate spatial mode for signal transmission. Cores 222a-222g are separated from each other by a distance (i.e. the core pitch) that is significantly larger than the core diameter for each core 222a-222g in order to reduce inter-core mode coupling to a negligible level (to avoid the need for MIMO processing at the receiver).

Figures 2D, 2E, 2F:
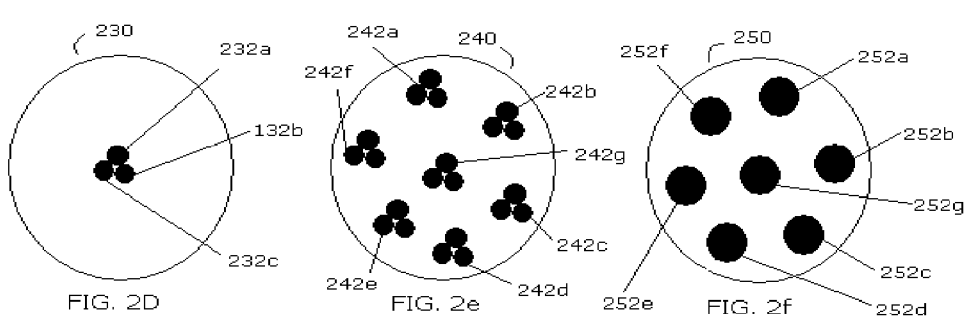

FIG. 2d illustrates an exemplary coupled multi-core fiber 230. The coupled multi-core fiber 230 includes multiple single-mode cores 232a-232c. In the coupled multi-core fiber 230, the core pitch is reduced to increase the density of cores 232a-232c within the fiber. Each of the cores 232a-232c provides a single spatial mode for signal transmission. Both multi-mode fiber 210 of FIG. 2b and coupled multi-core fiber 230 can achieve higher mode density than the "uncoupled" multi-core fiber 220 of FIG. 2c. However, multi-mode fiber 210 of FIG. 2b and coupled multi-core fiber 230 require extra digital signal processing (DSP) at the receiver (e.g., MIMO processing) to "undo" the mode coupling occurring due to the imperfect fiber manufacturing process as well as accidental macro- and micro-bending that may occur when cabled and deployed in the real world.

FIG. 2e illustrates an exemplary compound multi-core fiber 240 which may consist of multiple "isolated" (or "uncoupled") groups of coupled multiple cores 242a-242g. The term "coupled cores" means that core-to-core distance between individual cores within each multiple core group 242a-242g (i.e., the nominal core-to-core pitch) is small enough such that the mode coupling within each multiple cores 242a-242g is strong while the core-group-to-core-group distance is large enough such that the mode coupling between core groups 242a-242g is weak. The compound multi-core fiber 240 enables higher fiber capacity with realistic CMOS capability.

FIG. 2f illustrates an exemplary compound multi-mode multi-core fiber 250 consisting of multiple "isolated"/"uncoupled" multi-mode/few-mode cores 252a-252g. The diameter of each of the cores 252a-252g is enlarged to support more than one transverse mode. The distance between each of the cores 252a-252g is large enough such that the mode coupling between cores 252a-252g is weak. Similar to the exemplary compound multi-core fiber 240, the exemplary compound multi-mode multi-core fiber 250 enables higher fiber capacity with realistic CMOS capability.

The allowable number of spatial modes in a multi-mode fiber or a coupled multi-core fiber is limited by a Complementary Metal-Oxide-Semiconductor (CMOS) processing capacity. To overcome this limitation, the compound multi-core 240 or the compound multi-mode multi-core fiber 250 designs, illustrated, respectively, in FIGS. 2e and 2f, can be used according to an advantageous embodiment.

For an SDM system using a multi-mode core or coupled multiple single-mode cores as is shown in FIGS. 2b, 2d, and 2e, signals transmitted via different spatial modes typically travel at different speeds (except for the degenerate modes), which can result in large inter-modal dispersion (e.g., the inter-mode dispersion between the LP01 mode and LP11 mode is typically greater than several thousands of psec/km in a three-mode fiber). Large inter-mode dispersion coupled with unavoidable mode coupling requires the use of prohibitively long MIMO filters at the receiver.

In accordance with an embodiment, the required MIMO filter length can be substantially reduced by using the methods and systems for distributed mode conversion or mode-mixing described herein. Multiple discrete spatial mode converters (SMCs) or spatial mode scramblers (SMSs) can be implemented along the fiber link for distributed mode conversion or mode-mixing.

Figure 3:
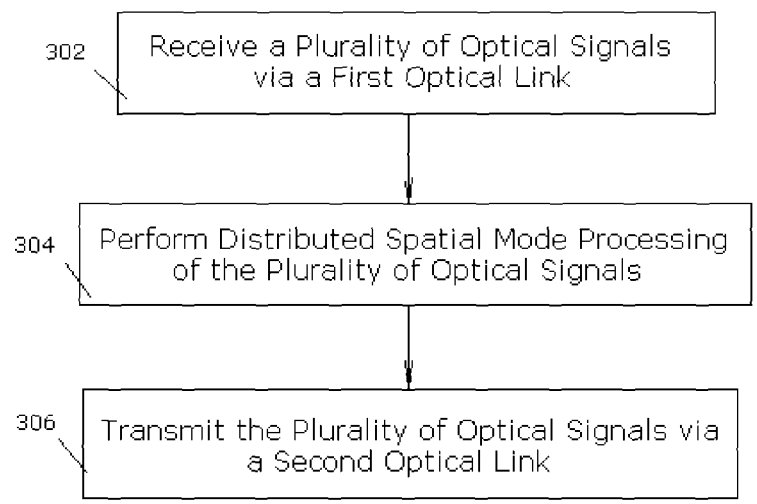
FIG. 3 illustrates a method for distributed spatial mode processing, according to an embodiment.

FIG. 3 illustrates an exemplary method 300 for the transmission performance of optical communication systems transmitting signals via multiple spatial modes, according to an embodiment. At step 302, a plurality of optical signals can be received by a spatial mode converter (SMC) or spatial mode scrambler (SMS) via a first optical link. It is to be understood that optical link can be a fiber of various configuration and/or structure. At step 304, distributed spatial processing of the plurality of optical signals can be performed by one or more SMC/SMS. In one embodiment, distributed spatial processing can be performed by switching modes (i.e., mode conversion) of the plurality of optical signals among available cores within the optical link (e.g., fiber). It is to be understood that switching modes of the plurality of optical signals among available cores can include switching modes of each of the plurality of optical signals or switching modes of some of the plurality of optical signals. In an embodiment, switching modes of the plurality of optical signals among available cores can include switching modes on a group-by-group basis such that a group of modes of a plurality of optical signals is switched with another group of modes of a plurality of optical signals.

In another embodiment, distributed spatial processing can be performed by distributed spatial mode filtering of optical signals from one or more cores along the optical link to improve a performance of the SDM system by preventing or minimizing crosstalk between the optical signals being transmitted via the optical link. It is to be understood that distributed spatial mode filtering can include filtering of one or more optical signals along the optical link. It is also to be understood that, to improve a performance of the SDM system, distributed spatial mode processing can include a combination of distributed spatial mode conversion and distributed spatial mode scrambling along the optical fiber.

At step 306, the plurality of optical signals can be transmitted via second optical link of the fiber.

Figure 12:
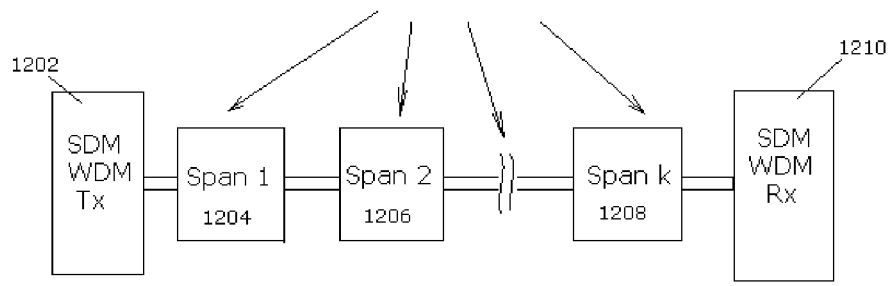

In accordance with an embodiment, the mode mixing or conversion can also be incorporated within the transmission fiber itself (e.g., by intentionally introducing fiber bending while drawing the fiber or in cabling, as illustrated on FIG. 12).

It is to be understood by a person ordinarily skilled in the art that the spatial mode conversion can be implemented by utilizing several techniques and methods, such as fiber-grating-based technique, Liquid Crystal on Silicon (LCoS) method, or space optics method.

Figure 4A:
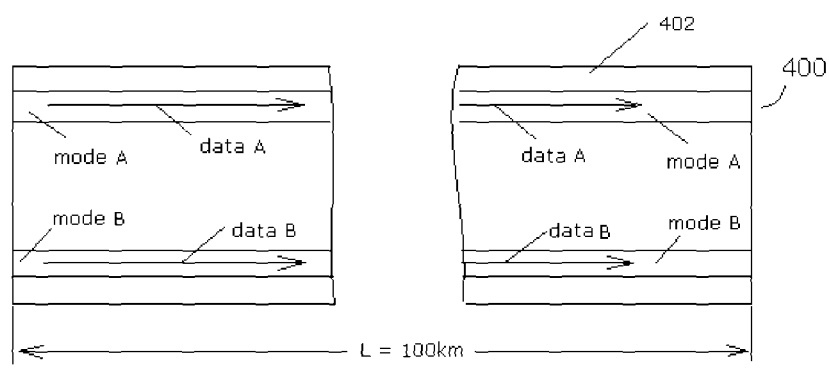
FIGS. 4A-4B illustrate examples of distributed spatial mode conversion in a two-mode fiber, in accordance with an embodiment
Figure 4B:
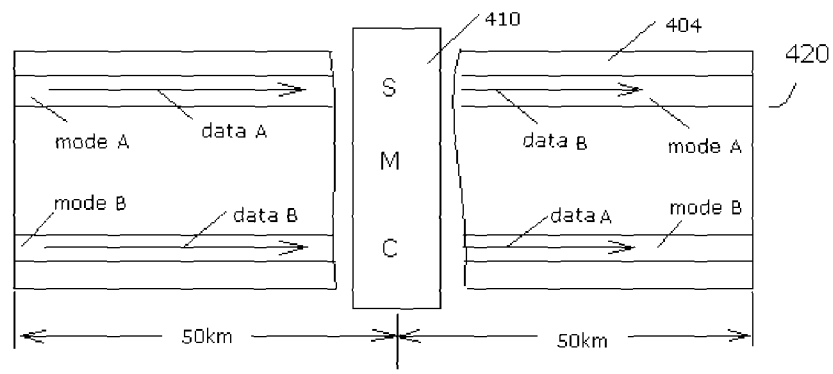

FIGS. 4A and 4B illustrate examples in which a two-mode fiber is used to transmit two data signals: data A and data B, over a fiber length of L=100 km. Specifically, FIG. 4A illustrates a conventional SDM system 400 in which one of the two spatial modes is used to transmit data A over the whole fiber length L and the other spatial mode is used to transmit data B over the whole fiber length L of the SDM system 400. Assuming that the inter-mode dispersion coefficient $D_m$ between mode A and mode B is 4 ps/m, at the receiver, the accumulated mode dispersion $\tau_m$ or walk-off between signals A and B is 400,000 ps for a fiber length of L=100 km.

FIG. 4B illustrates an SDM system 420 in which an SMC 410 is placed in the middle of the 100 km fiber of SDM system 420 where in the first 50 km mode A transmits data A and mode B transmits data B, while in the second 50 km the SMC 410 will cause mode B to transmit data A and mode A to transmit data B. In this case, after 100 km of transmission, the net walk-off or mode dispersion $\tau_m$ between data A and data B will be zero, assuming that no mode coupling occurs during transmission. One skilled in the art will understand that, in more realistic case where mode coupling does occur along the fiber, the net modal dispersion $\tau_m$ may not be zero but will be smaller than in the case illustrated in FIG. 4A. It is to be understood that the net modal dispersion $\tau_m$ can be reduced even further if more than one SMC is placed along the fiber link (e.g., an SMC can be placed at every splice, which typically occur every 3 to 5 km).

Figure 5:
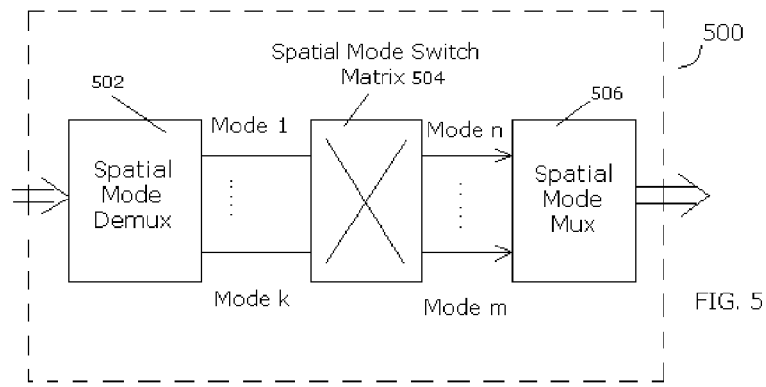
FIG. 5 illustrates an exemplary functional block diagram for a spatial mode converter, in accordance with an embodiment.

FIG. 5 illustrates an exemplary functional block diagram for a spatial mode converter (SMC) 500 where spatial mode conversion is performed on a mode-by-mode basis, according to an embodiment. In an embodiment, the SMC 500 can include a spatial mode demultiplexer 502 communicatively coupled to a spatial mode switch matrix 504, which, in turn, is communicatively coupled to a spatial mode multiplexer 506. The spatial mode multiplexer 506 is used to multiplex a plurality of optical signals onto a single optical fiber by using a plurality of modes to transmit the plurality of optical signals, thus increasing optical fiber transmission capacity. The spatial mode demultiplexer 502 is a device taking a single input fiber that carries one or more signals on a plurality of modes of a fiber and separates those signals over multiple modes in separate fiber outputs. The spatial mode switch matrix 504 is a device that performs a mode conversion based on a number of factors, such as type (e.g., single-mode, multi-mode, "uncoupled" multi-core, "coupled" multi-core, etc.) of optical fiber in the SMC 500. In an embodiment, a mode conversion is switching of the optical signal from one of a plurality of spatial modes onto one other of the plurality of spatial modes within the optical fiber. It is to be understood that the spatial mode converter 500 can also be used to enable bidirectional communication.

In an advantageous embodiment, the input of the SMC 500 receives an optical signal via a first optical link of a fiber. The optical signal is demultiplexed by taking the optical signal, separating the signals being transmitted on the various modes, and selecting one of one or more data-output-lines of the spatial mode demultiplexer 504 to transmit one or more of the signals on the various modes. Demultiplexed optical signal is then transmitted to the spatial mode switch matrix 504 for a mode conversion. Subsequently, converted optical signal is transmitted to the spatial mode multiplexer 506 to be transmitted via a second optical link.

In an embodiment, the spatial mode switch matrix 504 determines a mode conversion in the SMC 500 in a deterministic way, i.e., upon processing of optical signals received from the spatial mode demultiplexer 502, the spatial mode switch matrix 504 performs spatial mode conversion in accordance with pre-defined algorithms and based on a type of the optical link used for transmission of the optical signal. In another embodiment, mode conversion can be performed by the spatial mode switch matrix 504 in a random way.

Figure 6:
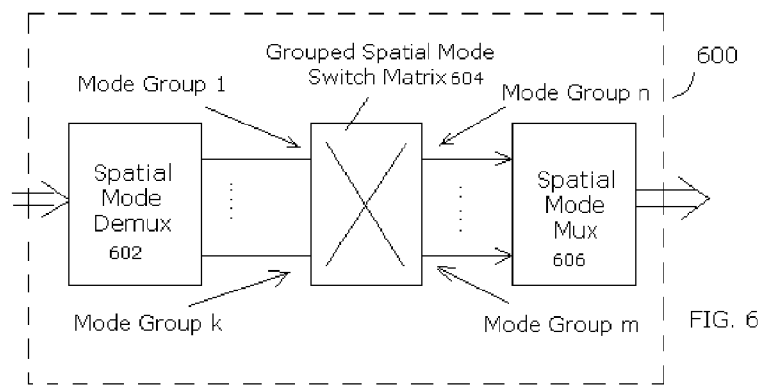
FIG. 6 illustrates an exemplary functional block diagram for a spatial mode converter for a mode-group-by-mode-group spatial mode conversion, in accordance with an embodiment.

FIG. 6 illustrates an exemplary functional block diagram for a spatial mode converter (SMC) 600 where spatial mode conversion is performed on a mode-group-by-mode-group basis, according to an embodiment. In an embodiment, the SMC 600 can include a spatial mode demultiplexer 602 communicatively coupled to a spatial mode switch matrix 604, which, in turn, is communicatively coupled to a spatial mode multiplexer 606. The spatial mode multiplexer 606 is used to multiplex a plurality of optical signals onto a single optical fiber by using a plurality of mode groups to transmit the plurality of optical signals, to increase optical fiber transmission capacity. The spatial mode demultiplexer 602 is a device taking a single input signal that carries one or more signals on a plurality of modes groups of a fiber and separates those signals over multiple mode groups in separate fiber outputs. The spatial mode switch matrix 604 is a device that performs a mode conversion based on a number of factors, such as type (e.g., single-mode, multi-mode, "uncoupled" multi-core, "coupled" multi-core, etc.) of optical fiber in the SMC 600. In an embodiment, a mode conversion is switching of the optical signal from one group of a plurality of spatial modes onto one other group of the plurality of spatial modes within the optical fiber. It is to be understood that the spatial mode spatial mode converter (SMC) 600, where spatial mode conversion is performed on a mode-group-by-mode-group basis, can also be used to enable bidirectional communication.

In an advantageous embodiment, the input of the SMC 600 is an optical signal via a first optical link of a multi-mode fiber. The optical signal is demultiplexed by taking the optical signal and separating the signals being transmitted on the various modes, and selecting one of one or more groups of data-output-lines of the spatial mode demultiplexer 604 to transmit one or more of the signals on the various mode groups. Demultiplexed optical signal is then transmitted to the spatial mode switch matrix 604 for a mode conversion. Subsequently, converted optical signal is transmitted to the spatial mode multiplexer 606 to be transmitted via a second optical link.

In an embodiment, the spatial mode switch matrix 604 determines a mode conversion in the SMC 600 in a deterministic way, i.e., upon processing of optical signals received from the spatial mode demultiplexer 602, the spatial mode switch matrix 604 performs spatial mode conversion in accordance with pre-defined algorithms and based on a type of the optical link used for transmission of the optical signal. In another embodiment, mode conversion can be performed by the spatial mode switch matrix 604 in a random way.

Those skilled in the art will understand that a first optical link and a second optical link can be any type of fiber illustrated in FIGS. 2b-2f. It is to be understood that discrete SMCs or SMSs can be included in the optical amplifiers and/or ROADMs that are placed between spans. Those skilled in the art will understand that a mode conversion by SMCs and SMSs can be repeated a number of times throughout the transmission of the optical signal to compensate detrimental inter-modal dispersion, mode-dependent loss, and inter-mode crosstalk during transmission.

Figure 7:
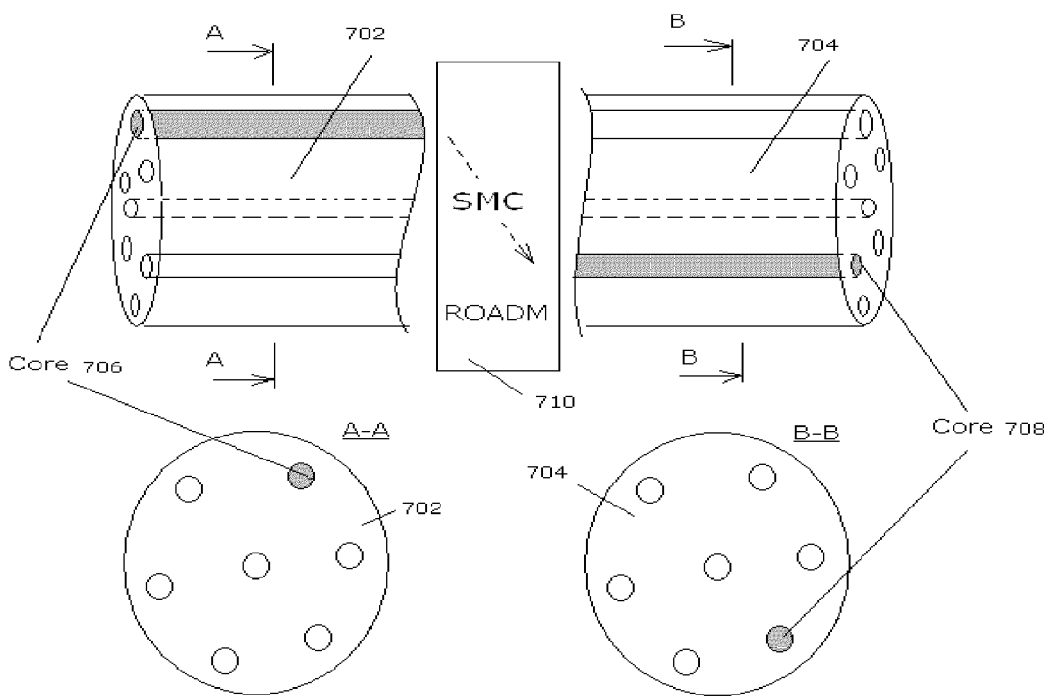
FIG. 7 illustrates an SDM system including a SMC/ROADM, in accordance with an embodiment.

In accordance with an embodiment, the optical amplifiers and/or ROADMs in an SDM system can provide a natural place to incorporate SMC because the optical signals from the multiple cores or multiple modes likely will be in free space for gain equalization or switching purposes. FIG. 7 illustrates an SDM system which includes a SMC/ROADM 710 which is situated between a 7-core fiber 702 and a 7-core fiber 704. The SMC/ROADM 710 switches a signal carried by a wavelength on each of the 7 cores of fiber 702 to a different one of the 7 cores of fiber 704. For example, SMC/ROADM 710 switches the optical signal carried in core 706 of fiber 702 to core 708 of fiber 704. The signal in each core of fiber 702 is switched to a different core of fiber 704, thus achieving discrete mode conversion. With the use of distributed mode conversion or mixing, the spatial mode used for transmitting a particular signal changes from fiber segment to segment. As a result, the accumulated inter-modal dispersion experienced by the signal decreases due to averaging.

According to an embodiment, the use of distributed mode conversion or mixing also can reduce mode-dependent loss as the signal is transmitted via different spatial modes along the fiber and thus the average loss among a plurality of transmitted signals at the end of transmission will be close to identical. For an SDM system using only "uncoupled" multi-core fiber, where no MIMO processing is used at the receiver, core-to-core crosstalk may become a problem for the cores having highest crosstalk (e.g., the center core for a typical seven-core fiber of FIG. 2c) as such crosstalk increases linearly with transmission distance.

According to an embodiment, the problem of the cores having high crosstalk due to large transmission distance can be substantially mitigated by the proposed distributed mode conversion method in which a particular signal is transmitted over different cores from one fiber segment to another segment, from one span to another span, or from one link to another link. As explained above, the mode conversion can be implemented in network elements such as an optical amplifier and/or ROADM. For an SDM system using a compound multi-mode, multi-core fiber or compound multi-core fiber, mode-by-mode conversion method can be applied to each multi-mode core or each coupled-core group (to reduce the detrimental impact from inter-modal dispersion and mode-dependent loss), whereas the group-by-group mode conversion method can be used to mitigate crosstalk between multi-mode cores or between coupled core groups.

Figure 8:
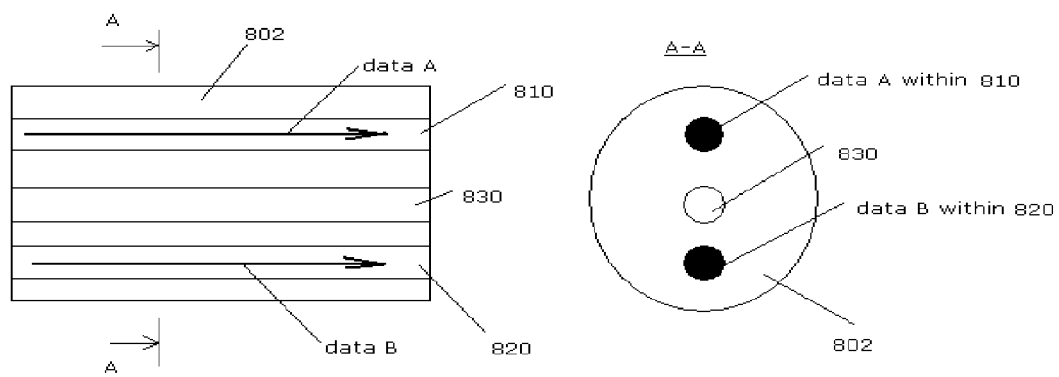
FIG. 8 illustrates an example of spatial mode filtering, in accordance with an embodiment.

In accordance with an embodiment, distributed spatial mode filtering can be used to improve the performance for an SDM system using only a portion of the available spatial modes for signal transmission. FIG. 8 illustrates an example of spatial mode filtering. As illustrated in FIG. 8, the two fundamental modes of cores 810 and 820 are used to transmit two independent signals (data A and data B) in a three core fiber 802, where the fundamental mode of core 830 is not used for signal transmission.

During transmission, the signal energy can couple into the fundamental mode of core 830 from the fundamental modes of cores 810 or 820, and furthermore, the mode of core 830 can couple back into the modes of cores 810 or 820, causing crosstalk. Such crosstalk can be effectively mitigated by performing distributed spatial mode filtering, either by filtering the fundamental mode of core 830 during transmission along the fiber or by adding multiple discrete spatial mode filters along the fiber link (e.g. at the optical amplifiers and/or ROADMs).

In accordance with an alternative embodiment, the fiber of FIG. 8 could be few-mode fiber, where two degenerate modes, the LP11$a$ and LP11$b$ modes, are used to transmit two independent signals (data A and data B), and where fundamental mode (LP01) is not used for signal transmission. During transmission, the signal energy can couple into the fundamental mode from the degenerate modes LP11$a$ and LP11*b*, and furthermore, the fundamental mode can couple back into the degenerate modes, causing crosstalk. Such crosstalk can be effectively mitigated by performing distributed spatial mode filtering, either by filtering the fundamental mode during transmission along the fiber or by adding multiple discrete spatial mode filters along the fiber link (e.g. at the optical amplifiers and/or ROADMs).

Figure 9:
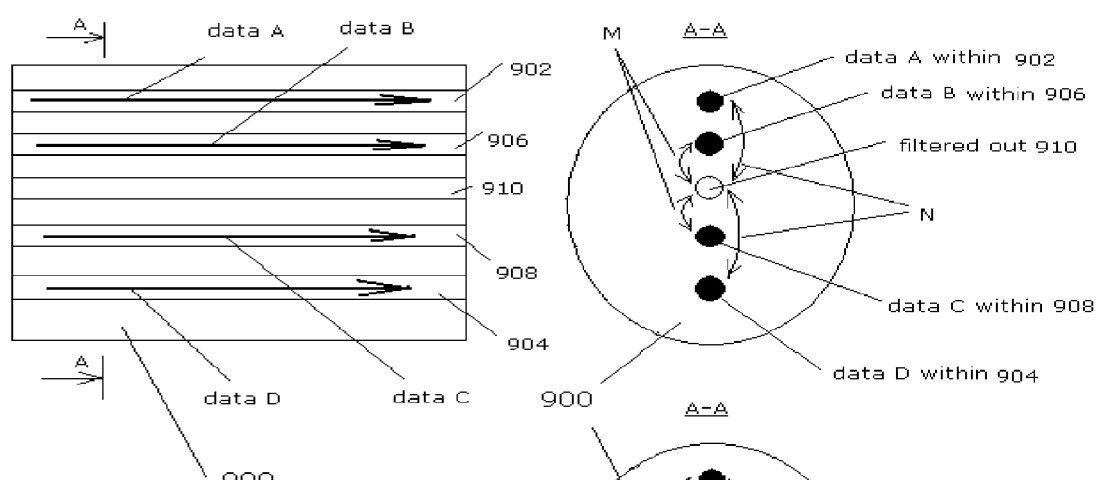
FIG. 9 illustrates an example in which distributed mode conversion and distributed mode filtering are used together, in accordance with an embodiment.
Figure 9:
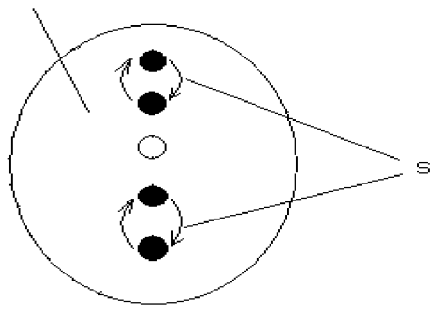

FIG. 9 illustrates an example in which distributed mode conversion and distributed mode filtering are used together to improve the performance of an SDM system. As shown in FIG. 9 an exemplary SDM system which uses a five-core fiber 900 as the transmission medium to transmit four independent signals over fundamental modes of cores 906, 908, 902, and 904, while the fundamental mode of core 910 is not used for signal transmission. In this case, distributed spatial mode filtering of the fundamental mode in core 910 can be used to reduce the crosstalk signal present in the fundamental modes of cores 906 and 908 resulting from mode conversion M from cores 906 to 910 to 906, 908 to 910 to 906, 906 to 910 to 908, and 908 to 910 to 908. Similarly, distributed spatial mode filtering of the fundamental mode in core 910 can be used to reduce the crosstalk signal present in the fundamental modes of cores 902 and 904 resulting from mode conversion N from cores 902 to 910 to 902, 904 to 910 to 902, 902 to 910 to 904, and 904 to 910 to 904. Group-by-group distributed mode conversion S, where fundamental modes of cores 906 and 908 are converted to fundamental modes of cores 902 and 904, respectively, and vice versa, can be used to reduce the impairment from inter-mode dispersion (between 906-908 and 902-904) and mode-dependent loss.

In accordance with another embodiment, distributed mode conversion and distributed mode filtering are used together to improve the performance of an SDM system based on multimode fiber. For example, for an SDM system using a five-mode fiber (with modes LP01 fundamental mode, degenerate modes LP11*a* and LP11*b*, and degenerate modes LP21*a* and LP21*b*) as the transmission medium, four independent signals are transmitted over two modes LP11*a* and LP11*b* and two modes LP21*a* and LP21*b*, while the fundamental mode is not used for signal transmission. Distributed spatial mode filtering of the fundamental mode can be used to reduce the crosstalk signal present in the LP11*a* and LP11*b* modes caused by cross-talk via mode conversions LP11*b*-LP01-LP11*a*, LP21*a*-LP01-LP11*a*, LP11*a*-LP01-LP11*b*, LP21*b*-LP01_LP11*b*, etc. Group-by-group distributed mode conversion of LP11*a* to LP21*a* and LP11*b* to LP21*b* and vice versa can be used to reduce the impairment from inter-mode dispersion between LP11 and LP21 modes and mode-dependent loss.

Figure 10:
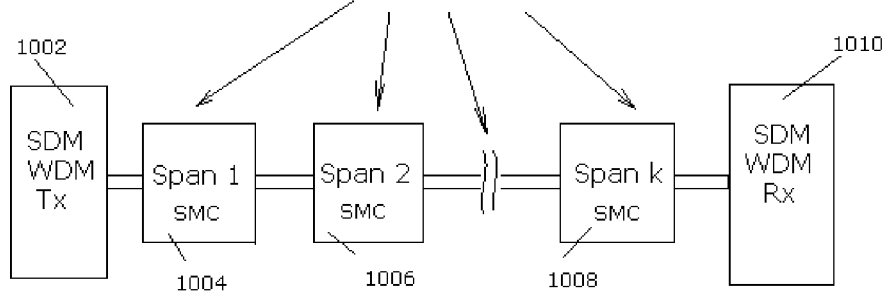
FIGS. 10-12 illustrate exemplary methods for distributed spatial mode conversion, in accordance with various embodiments.
Figure 11:
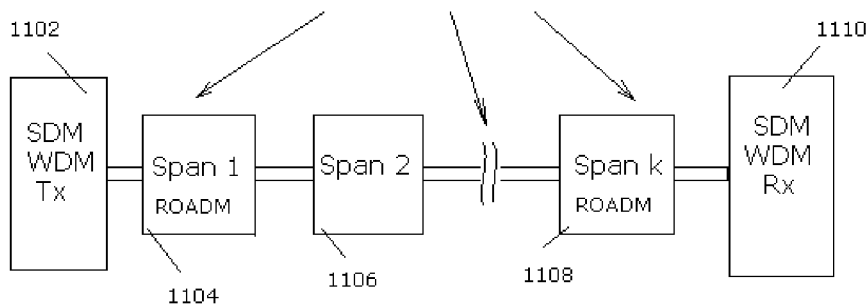

FIGS. 10-12 illustrate exemplary methods for distributed spatial mode conversion, in accordance with various embodiments. FIG. 10 illustrates exemplary SDM system which includes SDM-WDM transmitter 1002, SDM-WDM receiver 1010, and one or more spans 1004, 1006, and 1008 of optical fiber where each span 1004, 1006, and 1008 includes a spatial mode converter/filter.

FIG. 11 illustrates exemplary SDM system which includes SDM-WDM transmitter 1102, SDM-WDM receiver 1110, and one or more spans 1104, 1106, and 1108 of optical fiber. As shown in FIG. 11, a ROADM is included in only some spans (1104 and 1108) of the spans 1104, 1106, and 1108. For example, spatial mode converters and/or spatial mode filters may be included only in spans 1104 and 1108 including ROADM. It is to be understood that the number of spatial mode converter/filters situated along optical fiber can depend of a length of the optical fiber.

In an embodiment, inter-mode spatial conversion or mode mixing can be performed in optical fiber itself. The inter-mode spatial conversion or mode mixing can be performed in optical fiber when, for example, bends or long period gratings are induced in the fiber. The long period fiber gratings along the fiber length may be achieved using a variety of methods, including squeezing the fiber against a periodic external corrugation structure, etching corrugated structures directly into the fiber cladding, generating index grating using acoustic waves, or producing photo-induced index grating with intense ultra-violet radiation. FIG. 12 illustrates an exemplary SDM system which includes SDM-WDM transmitter 1202, SDM-WDM receiver 1210, and one or more fiber spans 1204, 1206, and 1208 of optical fiber, where each fiber span 1204, 1206, and 1208 includes bends of optical fiber. In another embodiment, an exemplary SDM system can include SDM-WDM transmitter 1202, SDM-WDM receiver 1210, and one or more fiber spans 1204, 1206, and 1208 of optical fiber, where each fiber span 1204, 1206, and 1208 includes long period gratings. It is to be understood that bends can be induced in the optical fiber during the manufacturing of the optical fiber, during the cabling process, and/or during installation of the optical fiber within a signal communication infrastructure. It is also to be understood that bends in the optical fiber can be embedded randomly or in accordance to a predetermined scheme.

One skilled in the art will recognize that methods of FIGS. 1, 3, 5, and 6 are non-limiting and that components of the presented system may be combined in any way in various embodiments and may include any additional and/or desired components and/or configurations.

Figure 13:
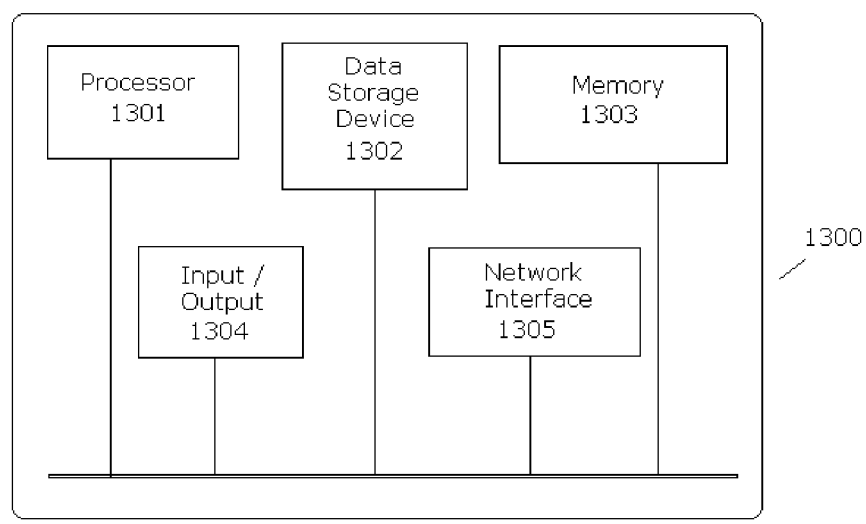
FIG. 13 illustrates a high-level block diagram of a computer capable of implementing an exemplary method and system for distributed spatial mode conversion.

FIG. 13 is a high-level block diagram of an exemplary computer that may be used for implementing distributed spatial mode processing. Computer 1300 comprises a processor 1301 operatively coupled to a data storage device 1302 and a memory 1303. Processor 1301 controls the overall operation of computer 1300 by executing computer program instructions that define such operations. The computer program instructions may be stored in data storage device 1302, or other computer readable medium, and loaded into memory 1303 when execution of the computer program instructions is desired. Thus, methods of FIGS. 1, 3, 5, and 6 can be defined by the computer program instructions stored in memory 1303 and/or data storage device 1302 and controlled by processor 1301 executing the computer program instructions. For example, the computer program instructions can be implemented as computer executable code programmed by one skilled in the art to perform an algorithm defined by the method of FIGS. 1, 3, 5, and 6. Accordingly, by executing the computer program instructions, the processor 1301 executes an algorithm defined by the method steps of FIG. 3. Computer 1300 also includes one or more network interfaces 1305 for communicating with other devices via a network. Computer 1300 also includes one or more input/output devices 1304 that enable user interaction with computer 1300 (e.g., display, keyboard, mouse, speakers, buttons, etc.).

Processor 1301 may include both general and special purpose microprocessors, and may be the sole processor or one of multiple processors of computer 1300. Processor 1301 may comprise one or more central processing units (CPUs), for example. Processor 1301, data storage device 1302, and/or memory 1303 may include, be supplemented by, or incorporated in, one or more application-specific integrated circuits (ASICs) and/or one or more field programmable gate arrays (FPGAs).

Data storage device 1302 and memory 1303 each comprise a tangible non-transitory computer readable storage medium.

Data storage device 1302, and memory 1303, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1304 may include peripherals, such as a printer, scanner, display screen, etc. For example, input/output devices 1304 may include a display device such as a cathode ray tube (CRT), plasma or liquid crystal display (LCD) monitor for displaying information to the user, a keyboard, and a pointing device such as a mouse or a trackball by which the user can provide input to computer 1300.

One skilled in the art will recognize that an implementation of an actual computer or computer system may have other structures and may contain other components as well, and that FIG. 13 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only for illustrative purposes and that various modifications may be implemented by those skilled in the art without departing from the scope and spirit of the invention. Those skilled in the art could implement various other feature combinations without departing from the scope and spirit of the disclosure.

The invention claimed is:

1. A method for distributed spatial mode processing comprising:
  receiving a plurality of optical signals, each of the plurality of optical signals received via one of a plurality of spatial modes on a first optical link;
  performing spatial mode conversion on each of the plurality of optical signals to switch a spatial mode associated with a respective one of the plurality of optical signals to a different one of the plurality of spatial modes, the spatial mode conversion being performed based on a bend in the first optical link; and
  transmitting the plurality of optical signals, each of the plurality of optical signals transmitted via the different one of the plurality of spatial modes on a second optical link.

2. The method of claim 1, wherein the first and second optical link each include a plurality of cores, and the performing spatial mode conversion on each of the plurality of optical signals to switch a spatial mode associated with a respective one of the plurality of optical signals to a different one of the plurality of spatial modes comprises:
  switching an optical signal received on each of the plurality of cores in the first optical link to a different one of the plurality of cores in the second optical link.

3. The method of claim 1, wherein the first optical link and the second optical link each have a plurality of groups of coupled cores, and performing spatial mode conversion on each of the plurality of optical signals to switch a spatial mode associated with a respective one of the plurality of optical signals to a different one of the plurality of spatial modes comprises:
  switching optical signals from each group of coupled cores in the first optical link to a different group of coupled cores in the second optical link on a group-by-group basis.

4. The method of claim 1, further comprising:
  filtering the plurality of spatial modes during transmission along the second optical link.

5. The method of claim 1, further comprising:
  repeating the receiving a plurality of optical signals, the performing spatial mode conversion on the plurality of optical signals, and the transmitting the plurality of optical signals at each of the plurality of spatial mode converters along a plurality of optical links.

6. The method of claim 5, wherein one of the plurality of spatial mode converters includes a Reconfigurable Optical Add-Drop Multiplexer.

7. The method of claim 1, wherein the receiving a plurality of optical signals, the performing spatial mode conversion on the plurality of optical signals, and the transmitting the plurality of optical signals are performed by a Reconfigurable Optical Add-Drop Multiplexer.

8. The method of claim 1, wherein performing spatial mode conversion comprises:
  implementing random spatial mode scrambling in the second optical link due to predetermined bends in the second optical link.

9. An apparatus for distributed spatial mode processing comprising:
  a memory storing computer program instructions; and
  a processor communicatively coupled to the memory, the processor for executing the computer program instructions, which, when executed on the processor, cause the processor to perform operations comprising:
    receiving a plurality of optical signals, each of the plurality of optical signals received via one of a plurality of spatial modes on a first optical link;
    performing spatial mode conversion on each of the plurality of optical signals to switch a spatial mode associated with a respective one of the plurality of optical signals to a different one of the plurality of spatial modes, the spatial mode conversion being performed based on a bend in the first optical link; and
    transmitting the plurality of optical signals, each of the plurality of optical signals transmitted via the different one of the plurality of spatial modes on a second optical link.

10. The apparatus of claim 9, wherein the first and second optical link each include a plurality of cores, and the performing spatial mode conversion on each of the plurality of optical signals to switch a spatial mode associated with a respective one of the plurality of optical signals to a different one of the plurality of spatial modes comprises:
  switching an optical signal received on each of the plurality of cores in the first optical link to a different one of the plurality of cores in the second optical link.

11. The apparatus of claim 9, wherein the first optical link and the second optical link each have a plurality of groups of coupled cores, and performing spatial mode conversion on each of the plurality of optical signals to switch a spatial mode associated with a respective one of the plurality of optical signals to a different one of the plurality of spatial modes comprises:

switching optical signals from each group of coupled cores in the first optical link to a different group of coupled cores in the second optical link on a group-by-group basis.

12. The apparatus of claim 9, further comprising:
filtering the plurality of spatial modes during transmission along the second optical link.

13. The apparatus of claim 9, further comprising:
repeating the receiving a plurality of optical signals, the performing spatial mode conversion on the plurality of optical signals, and the transmitting the plurality of optical signals at each of the plurality of spatial mode converters along a plurality of optical links.

14. The apparatus of claim 13, wherein one of the plurality of spatial mode converters includes a Reconfigurable Optical Add-Drop Multiplexer.

15. The apparatus of claim 9, wherein the receiving a plurality of optical signals, the performing spatial mode conversion on the plurality of optical signals, and the transmitting the plurality of optical signals are performed by a Reconfigurable Optical Add-Drop Multiplexer.

16. The apparatus of claim 9, wherein performing spatial mode conversion comprises:
implementing random spatial mode scrambling in the second optical link due to predetermined bends in the second optical link.

17. A non-transitory computer readable storage medium storing computer program instructions, which, when executed on a processor, cause the processor to perform operations comprising:
receiving a plurality of optical signals, each of the plurality of optical signals received via one of a plurality of spatial modes on a first optical link;
performing spatial mode conversion on each of the plurality of optical signals to switch a spatial mode associated with a respective one of the plurality of optical signals to a different one of the plurality of spatial modes, the spatial mode conversion being performed based on a bend in the first optical link; and
transmitting the plurality of optical signals, each of the plurality of optical signals transmitted via the different one of the plurality of spatial modes on a second optical link.

18. The non-transitory computer readable storage medium of claim 17, wherein the computer program instructions which, when executed by the processor, cause the processor to perform further operations comprising:
filtering the plurality of spatial modes during transmission along the second optical link.

19. The non-transitory computer readable storage medium of claim 17, wherein the computer program instructions which, when executed by the processor, cause the processor to perform further operations comprising:
repeating the receiving a plurality of optical signals, the performing spatial mode conversion on the plurality of optical signals, and the transmitting the plurality of optical signals at each of the plurality of spatial mode converters along a plurality of optical links.

20. The non-transitory computer readable storage medium of claim 17, wherein the computer program instructions which, when executed by the processor, cause the processor to perform further operations comprising:
the receiving a plurality of optical signals, the performing spatial mode conversion on the plurality of optical signals, and the transmitting the plurality of optical signals are performed by a Reconfigurable Optical Add-Drop Multiplexer.

\* \* \* \* \*